United States Patent
Kasuya et al.

(10) Patent No.: US 12,420,759 B2
(45) Date of Patent: Sep. 23, 2025

(54) VEHICLE CONTROL DEVICE

(71) Applicant: HONDA MOTOR CO., LTD., Tokyo (JP)

(72) Inventors: Kentaro Kasuya, Tokyo (JP); Ryo Koyama, Tokyo (JP); Tomohiro Hosono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 18/365,341

(22) Filed: Aug. 4, 2023

(65) Prior Publication Data

US 2024/0042981 A1    Feb. 8, 2024

(30) Foreign Application Priority Data

Aug. 8, 2022 (JP) ................................. 2022-126601

(51) Int. Cl.
*B60T 8/58*        (2006.01)
*B60T 7/12*        (2006.01)

(52) U.S. Cl.
CPC .... *B60T 8/58* (2013.01); *B60T 7/12* (2013.01); *B60T 2220/00* (2013.01); *B60T 2250/04* (2013.01)

(58) Field of Classification Search
CPC .......... B60T 8/58; B60T 7/12; B60T 2220/00; B60T 2250/04; B60W 30/18109; B60W 10/192; B60W 30/18145; B60W 2510/182; B60W 2520/10; B60W 2710/182

See application file for complete search history.

(56) References Cited

U.S. PATENT DOCUMENTS

2011/0130923 A1*  6/2011  Watanabe ............. B60T 8/1755
                                                    701/41
2021/0188252 A1*  6/2021  Lu ........................ B60W 40/12

FOREIGN PATENT DOCUMENTS

| JP | H11-49020 A | 2/1999 | |
| WO | WO-2011007396 A1 * | 1/2011 | ............ B60T 8/1755 |
| WO | WO-2019218097 A1 * | 11/2019 | ............ B60C 23/04 |
| WO | WO-2019218695 A1 * | 11/2019 | ............ B60W 10/04 |

* cited by examiner

*Primary Examiner* — Joseph J Dallo
(74) *Attorney, Agent, or Firm* — Rankin, Hill & Clark LLP (57) ABSTRACT

A vehicle control device includes an information acquirer that acquires information on driving conditions of a vehicle at least containing a steering angle and a vehicle speed; a brake force setter that sets a brake force to each of a plurality of wheels provided in the vehicle based on the driving conditions of the vehicle; and a brake controller that performs brake control for each of the plurality of wheels using the brake force set by the brake force setter, wherein the brake force setter remains the first brake force for the first specific wheel during a turn-over operation while the turn-over operation is performed from the one side steering position through a neutral position to other side steering position.

3 Claims, 7 Drawing Sheets

VEHICLE CONTROL DEVICE

BACKGROUND OF THE INVENTION

1. Field of the Invention

The present invention relates to a vehicle control device that performs brake control of each of multiple wheels provided in a vehicle.

2. Description of the Related Art

JPH11-049020A discloses the invention of a vehicle control device that performs brake control of each of multiple wheels provided in a vehicle.

The vehicle control device according to JPH11-049020A includes a steering sensor that detects a steering direction of a steering wheel, a braking device that performs a braking operation for each of the multiple wheels independently, and a brake force controller that generates a brake force on a turning-inner wheel (specific wheel) on a rear side in a vehicle traveling direction based on the traveling direction detected by a vehicle speed sensor and a steering direction detected by the steering sensor.

The vehicle control device according to JPH11-049020A executes tight-turn facilitation control of a specific wheel in order to facilitate a tight-turn of the vehicle, thereby making it possible to enhance the tight-turn performance with a simple configuration.

SUMMARY OF THE INVENTION

By the way, in the conventional vehicle control device described above, when the steering wheel is in a neutral position, a demand to facilitating tight-turn does not arise, so the brake force control for a specific wheel aiming at facilitating tight-turn is disabled. Moreover, in general, in a vehicle equipped with an automatic transmission, for example, when a shift position is set to a drive position, a propulsive force based on the creep phenomenon acts on the vehicle.

Now, for example, in a scene where the vehicle direction is turning around in a parking lot, a turn-over operation is performed in which the steering wheel is turned over from a one side steering position through the neutral position to other side steering position. During this operation, near a point where the steering wheel passes through the neutral position, the brake force control for the specific wheel for aiming at facilitating tight-turn is disabled.

In this case, the brake force for the specific wheel is released near where the steering wheel passes the neutral position, which may cause the vehicle to start moving abruptly. Such an abrupt vehicle movement can cause of problem of discomfort to the driver.

The present invention was made in view of the above circumstances, and has an object to provide a vehicle control device, even if the turn-over operation of the steering is performed, can create a comfortable driving environment by suppressing the abrupt vehicle movement, thereby contributing to a development of a sustainable transport system.

To achieve the above object, a vehicle control device according to the present invention includes: an information acquirer that acquires information on driving conditions of a vehicle at least containing a steering angle of a steering wheel and a vehicle speed; a brake force setter that sets a brake force to each of a plurality of wheels provided in the vehicle based on the driving conditions of the vehicle; and a brake controller that performs brake control for each of the plurality of wheels using the brake force set by the brake force setter, wherein when the steering wheel is in one side steering position, in a case of a first brake force is set to a first specific wheel selected based on at least the steering position, the brake force setter remains the first brake force on the first specific wheel during a turn-over operation while the turn-over operation is performed from the one side steering position through a neutral position to other side steering position.

The vehicle control device according to the present invention is capable of creating a comfortable driving environment by suppressing the abrupt vehicle movement even if the turn-over operation of the steering is performed, thereby contributing to a development of a sustainable transport system.

DETAILED DESCRIPTION OF THE EMBODIMENTS

Hereinafter, vehicle control devices according to an embodiment of the present invention will be described in detail with reference to the drawings as needed.

In the drawings to be described below, components having a common function or equivalent function will be denoted with a common reference sign in principle. For convenience of explanation, the size and shape of a characteristic chart are depicted schematically by deformation or exaggeration in some cases.

Outline of Vehicle Control Device 11 According to Embodiment of Invention

Figure 1:
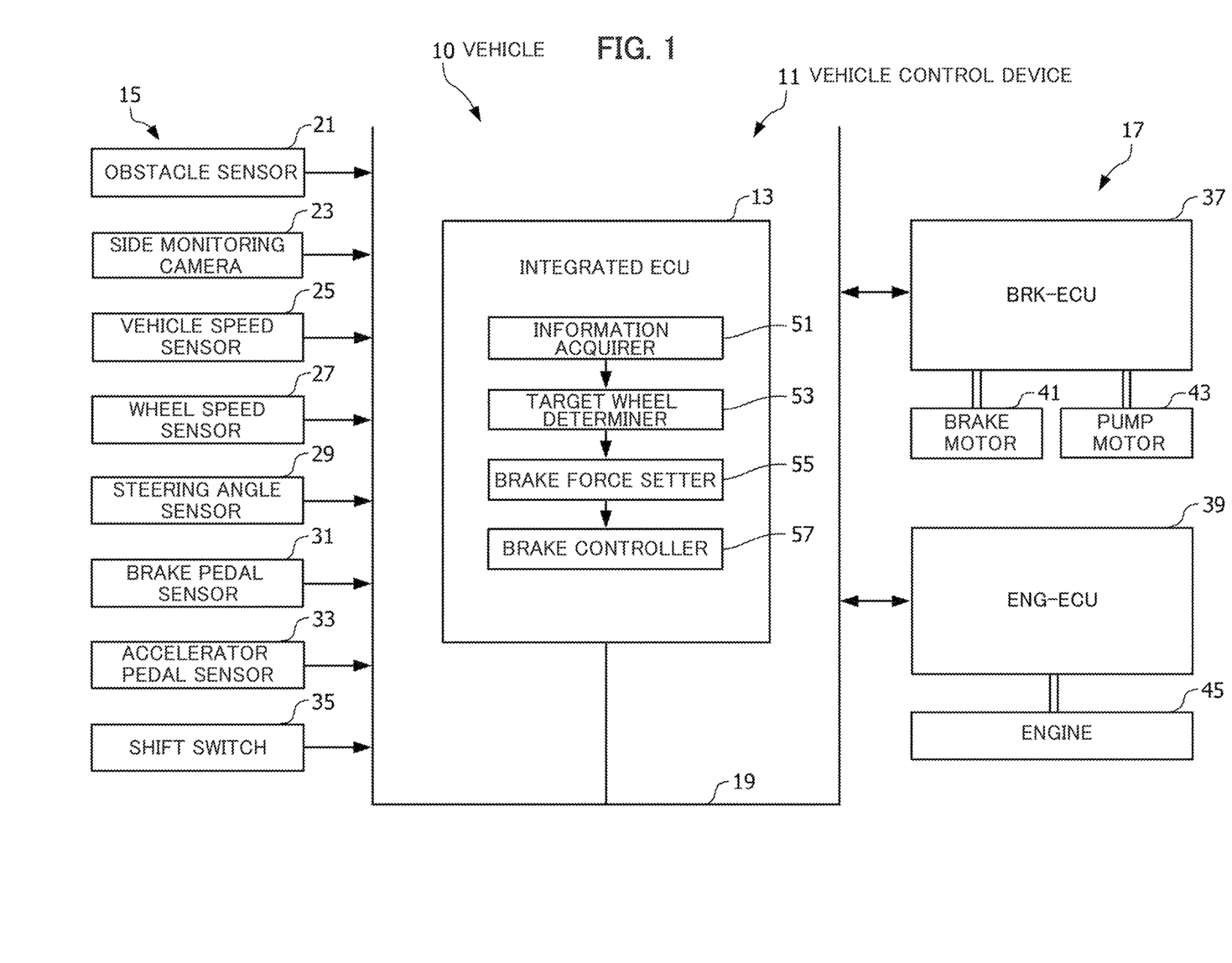
FIG. 1 is a block diagram showing an outline of the vehicle control device and its peripheral components according to an embodiment of the present invention.

A vehicle control device 11 according to an embodiment of the present invention will be described with reference to FIG. 1. FIG. 1 is a block diagram showing an outline of the vehicle control device 11 and its peripheral components according to the embodiment of the present invention.

As shown in FIG. 1, the vehicle control device 11 is configured such that an integrated electronic control unit (ECU) 13, an input system 15, and an output system 17 are connected to each other via a communication medium 19 such as a control area network (CAN) so that information can be exchanged with each other.

The integrated ECU 13 is composed of a microcomputer including a central processing unit (CPU), a read only memory (ROM), a random access memory (RAM), and so on. This microcomputer reads and executes programs and information stored in the ROM, and thereby operates to perform execution control of various functions which are equipped in the integrated ECU 13 and which includes specific wheel brake control aiming to facilitate a tight-turn of a vehicle 10.

The integrated ECU 13 has a function to execute the specific wheel brake control mainly aiming to facilitate a tight-turn of the vehicle 10. The internal configuration of the integrated ECU 13 will be described in detail later.

As shown in FIG. 1, as the input system 15, obstacle sensors 21, side monitoring cameras 23, a vehicle speed sensor 25, wheel speed sensors 27, a steering angle sensor 29, a brake pedal sensor 31, an accelerator pedal sensor 33, and a shift switch 35 are connected to the communication medium 19.

The obstacle sensors 21 have a function to obtain information on a distribution of objects existing around the vehicle 10 (hereinafter referred to as "obstacles"). Although the obstacle OB (for example, see FIGS. 6A and 6B and so on) is not particularly limited, the obstacle OB include columnar objects such as utility poles and traffic signs, structures such as block walls and guardrails, other vehicles, and so on. The information on the distribution of obstacles OB contains information on a positional relationship of each obstacle OB relative to the vehicle 10 and a separation distance BD between the vehicle 10 and the obstacle OB.

Although the obstacle sensors 21 are not particularly limited. For example, the obstacle sensors 21 are composed of sonar sensors, and son on, and installed at four corners of the vehicle 10.

The information on the distribution of obstacles OB existing around the vehicle 10 obtained by the obstacle sensors 21 is transmitted to the integrated ECU 13.

The side monitoring cameras 23 are installed at respective side mirrors (not shown) and have a function to capture images on the right and left sides of the vehicle 10.

The images on the right and left sides of the vehicle 10 captured by the side monitoring cameras 23 are transmitted to the integrated ECU 13.

The vehicle speed sensor 25 has a function to detect a vehicle speed (vehicle body speed) as a driving speed of the vehicle 10. The vehicle speed sensor 25 is attached to a crankshaft or a transmission of an internal combustion engine 45 and outputs a vehicle speed signal proportional to a rotation speed of a driving shaft.

The information on the vehicle speed detected by the vehicle speed sensor 25 is transmitted to all of the integrated ECU 13, a BRK-ECU 37, and an ENG-ECU 39 via the communication medium 19.

The wheel speed sensors 27 have a function to detect respective wheel speeds that are the rotation speeds of the multiple wheels provided in the vehicle 10. The wheel speed sensor 27 is attached to, for example, the vicinity of a rotor provided to each of the multiple wheels and outputs a wheel speed signal proportional to the rotation speed of the rotor.

The information on the wheel speeds detected by the wheel speed sensors 27 is transmitted to all of the integrated ECU 13, the BRK-ECU 37, and the ENG-ECU 39 via the communication medium 19.

The steering angle sensor 29 has a function to detect time-series information on a steering angle that is a rotation position of a steering wheel (not shown). The time-series information on the steering angle is expressed, for example, by assigning a numerical value [0] to a neutral position of the steering wheel, a numerical value with a positive sign to a right steering angle, and a numerical value with a negative sign to a left steering angle.

In other words, the time-series information on the steering angle contains steering direction time-series information expressed by the sign type (plus/minus) and steering degree time-series information expressed by the magnitude of the numerical value. In the process of information processing, the steering direction time-series information (the sign type) and the steering degree time-series information (the absolute value of the steering angle) in the time-series information on the steering angle are individually handled.

The steering angle sensor 29 is attached to, for example, a steering column, and outputs a steering angle signal (the time-series information on the steering angle) depending on a rotation position of a steering shaft.

The time-series information on the steering angle detected by the steering angle sensor 29 is transmitted to all of the integrated ECU 13, the BRK-ECU 37, and the ENG-ECU 39 via the communication medium 19.

The brake pedal sensor 31 has a function to detect a pressing operation amount and a pressing operation torque (BP operation information) of a brake pedal (not shown) operated for braking the vehicle 10 from an initial position (an operation position in a state where the driver's pressing operation is released).

The BP operation information detected by the brake pedal sensor 31 is transmitted to all of the integrated ECU 13, the BRK-ECU 37, and the ENG-ECU 39 via the communication medium 19.

The accelerator pedal sensor 33 has a function to detect a pressing operation amount (AP position information) of an accelerator pedal (not shown) operated for accelerating or decelerating the vehicle 10 from an initial position (an operation position in a state where the driver's pressing operation is released).

The AP position information detected by the accelerator pedal sensor 33 is transmitted to all of the integrated ECU 13, the BRK-ECU 37, and the ENG-ECU 39 via the communication medium 19.

The shift switch 35 has a function to receive a driver's selection operation of a shift range (for example, such as D range, R range, N range, and P range). The shift switch 35 is provided near the driver's seat in the vehicle 10.

Shift range operation information received by the shift switch 35 is transmitted to all of the integrated ECU 13, the BRK-ECU 37, and the ENG-ECU 39 via the communication medium 19.

Meanwhile, as the output system 17, the BRK-ECU 37 and the ENG-ECU 39 are connected to the communication medium 19 as shown in FIG. 1.

The BRK-ECU 37 has a function to operate a motor cylinder device (see, for example, JP2015-110378A) by driving a brake motor 41 according to a level of braking hydraulic pressure (primary hydraulic pressure) generated in a master cylinder (not shown) in response to a driver's braking operation, and thereby generate braking hydraulic pressure (secondary hydraulic pressure) for braking the vehicle 10.

For example, the BRK-ECU 37 also has a function to, in response to a deceleration control command transmitted from a brake controller 57 belonging to the integrated ECU 13, drive a pressure pump (not shown) by using a pump motor 43 and thereby perform control to adjust the brake force for each of the multiple (four) wheels to a brake force depending on a target hydraulic pressure of the wheel.

The ENG-ECU 39 has a function to perform drive control of the internal combustion engine 45 based on information on a driver's acceleration operation (accelerator pedal press amount) obtained via the accelerator pedal sensor 33.

In more detail, the ENG-ECU 39 performs the drive control of the internal combustion engine 45 by controlling operations of a throttle valve (not shown) for adjusting the intake air amount of the internal combustion engine 45, an injector (not shown) for injecting the fuel gas, an ignition plug (not shown) for igniting the fuel, and so on.

Internal Configuration of Integrated ECU 13

Next, the internal configuration of the integrated ECU 13, which is main components of the vehicle control device 11 of the embodiment of the present invention, will be described with reference to FIG. 1 as needed.

As shown in FIG. 1, the integrated ECU 13 comprises of an information acquirer 51, a target wheel determiner 53, a brake force setter 55, and a brake controller 57.

The information acquirer 51 has a function to acquire each of the information on the distribution of obstacles existing around the vehicle 10 obtained by the obstacle sensors 21, the information of the images on the right and left sides of the vehicle 10 captured by the side monitoring cameras 23, the information on the vehicle speed detected by the vehicle speed sensor 25, the information on the wheel speeds detected by the wheel speed sensors 27, time-series information on the steering angle detected by the steering angle sensor 29, time-series information on the steering angle speed calculated by time differentiating the time-series information on the steering angle, the BP operation information detected by the brake pedal sensor 31, the AP position information detected by the accelerator pedal sensor 33, and the shift range operation information received by the shift switch 35.

The target wheel determiner 53 has a function to determine a target wheel to be involved in tight-turn facilitation control aiming to facilitate a tight-turn of the vehicle 10 based on the time-series information on the vehicle speed, the information on the wheel speeds, the information on the steering angle, and so on acquired by the information acquirer 51. In general, in the vehicle 10 that is turning while driving forward at a slow vehicle speed (a vehicle speed of about 10 km/h or lower at which the vehicle 10 can stop quickly), the rear turning-inner wheel is selected as the specific wheel.

The brake force setter 55 plays roles in calculating an integrated brake force IBF for the tight-turn facilitation control aiming to facilitate a tight-turn of the vehicle 10 based on the information on the vehicle speed VS, the information on the wheel speeds WS, the time-series information on the steering angle SA, a required brake force BF based on the BP operation information, and so on acquired by the information acquirer 51 and in setting the brake force on the calculated integrated brake force IBF to each of the multiple wheels including the specific wheel.

Various functions equipped in the brake force setter 55 will be described in detail later.

The brake controller 57 performs brake control for each of the wheels, including the specific wheel according to the brake force set by the brake force setter 55. Note that, the brake controller 57 executes the tight-turn facilitation control even in absence of input of BP operation information (the information on the required brake force BF).

Block Configuration Showing Main Components of Vehicle Control Device 11 According to Embodiment of Invention Next, main components of a vehicle control device 11 according to an embodiment of the present invention will be described with reference to FIGS. 2A to 2D as needed.

Figure 2A:
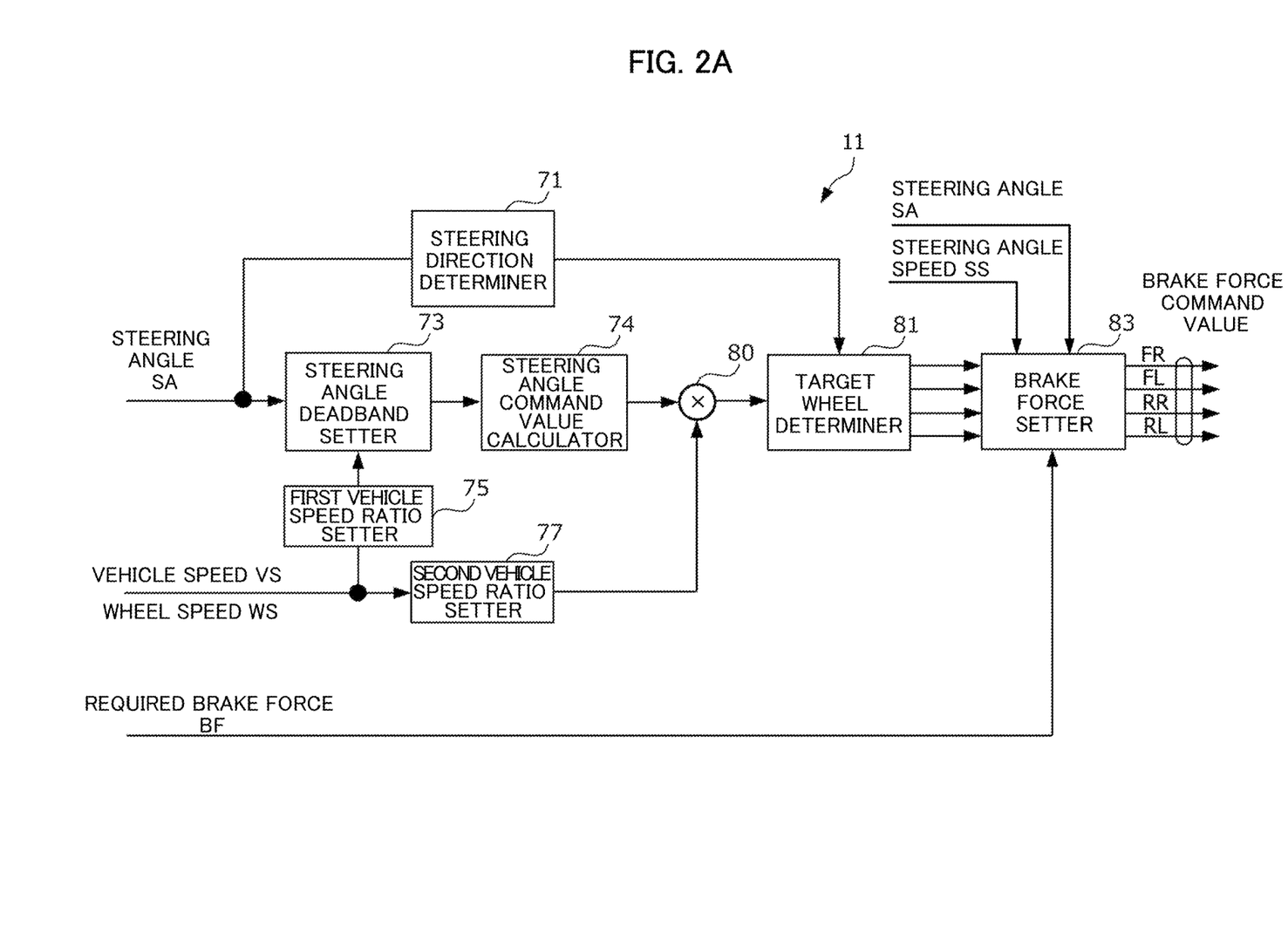
FIG. 2A is a block diagram showing main components of a vehicle control device according to the embodiment of the present invention.
Figure 2B:
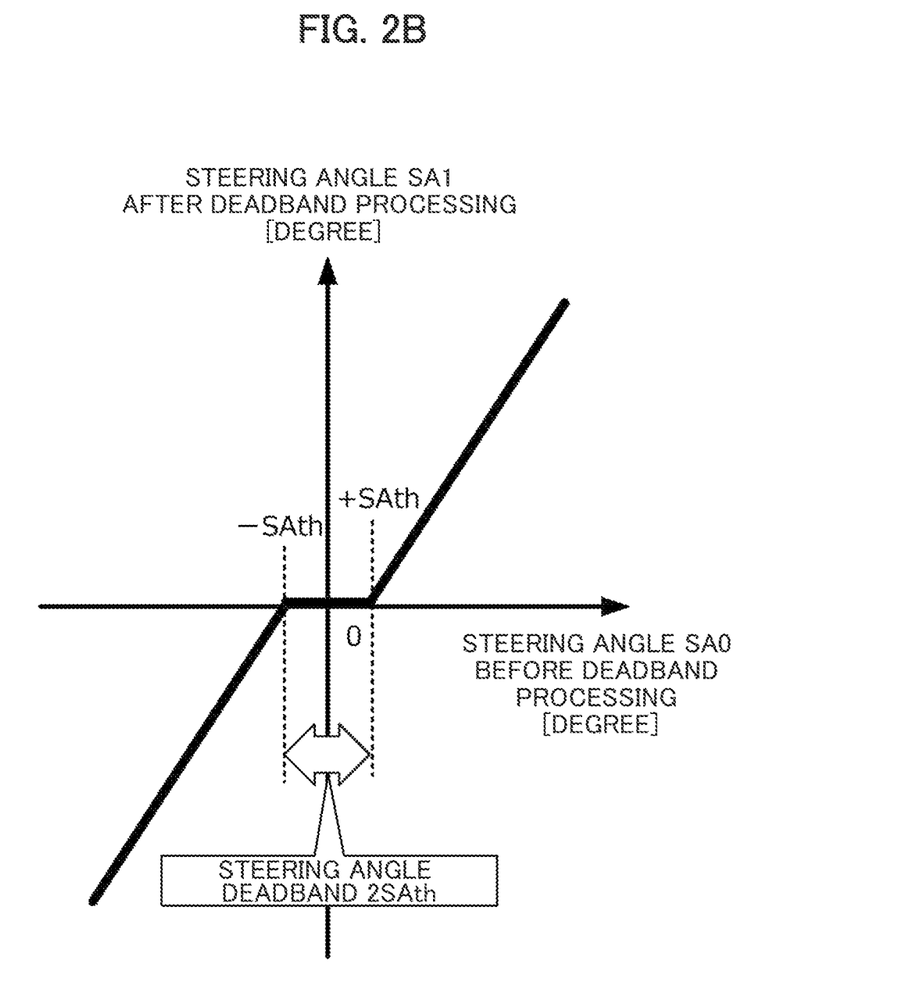
FIG. 2B is a characteristic chart that the vehicle control device according to the embodiment of the present invention refers to when setting a deadband for a steering angle, the characteristic chart presenting steering angles in comparison before and after deadband processing for the steering angle.
Figure 2C:
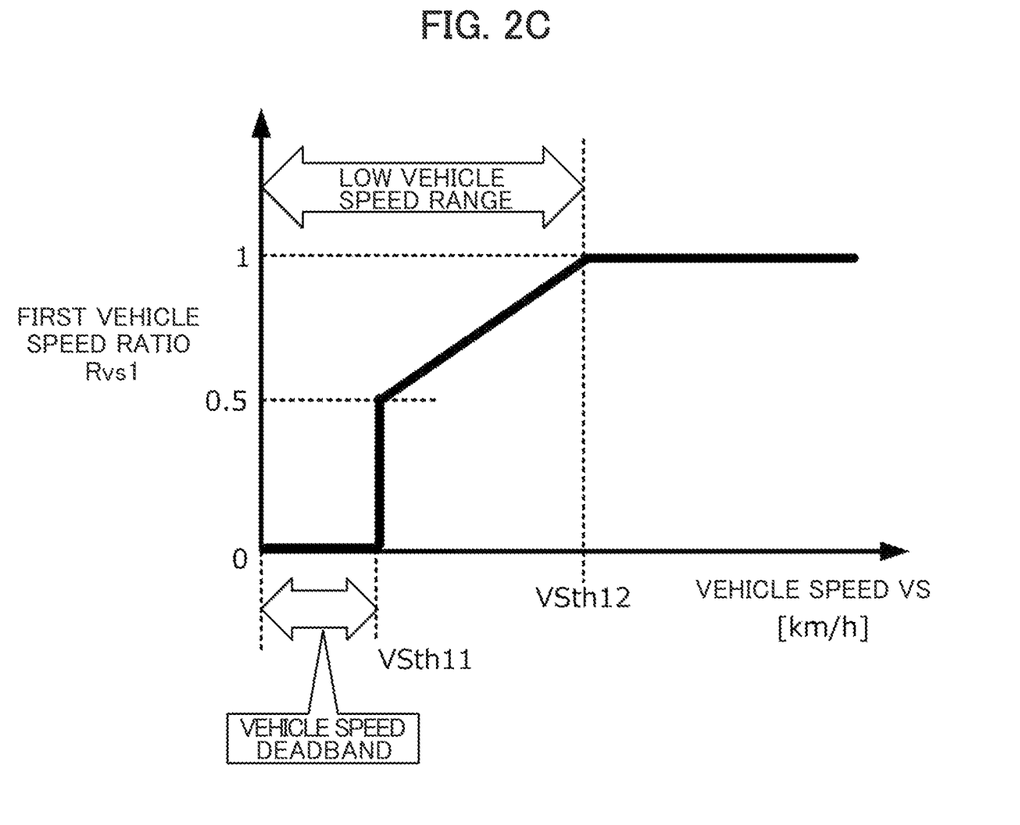
FIG. 2C is a characteristic chart of a first vehicle speed ratio that the vehicle control device according to the embodiment of the present invention refers to when changing a deadband for the steering angle according to a change in a vehicle speed when the vehicle speed is within a low vehicle speed range.
Figure 2D:
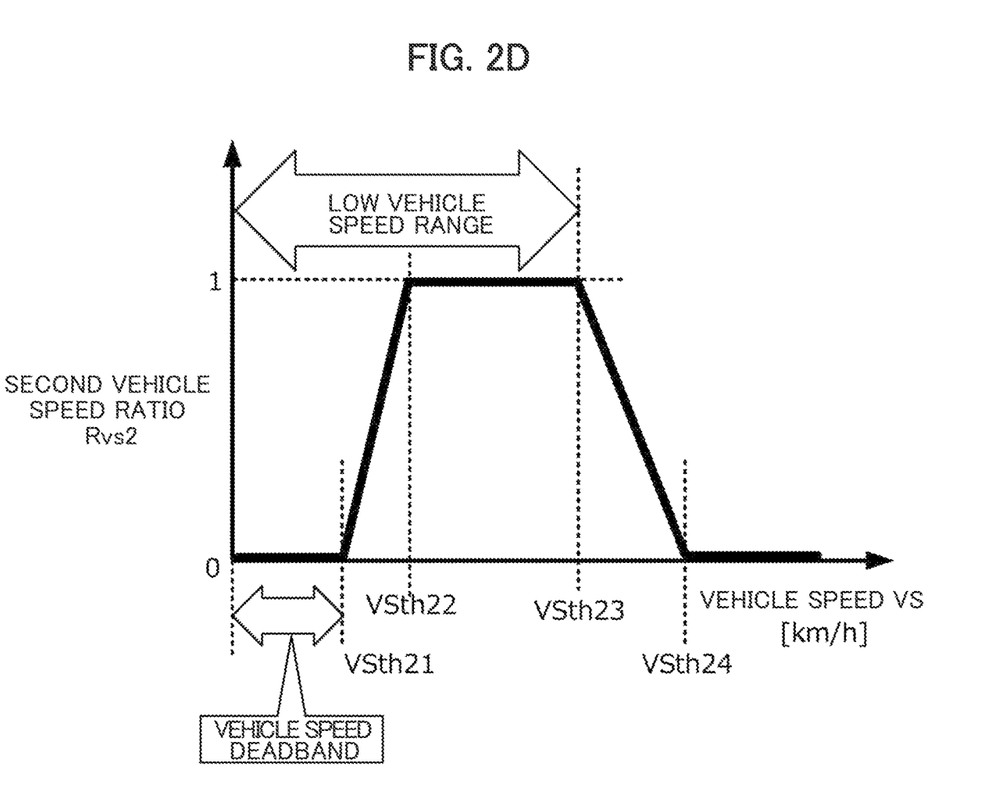
FIG. 2D is a characteristic chart of a second vehicle speed ratio that the vehicle control device according to the embodiment of the present invention refers to when changing a brake force for a specific wheel according to a change in the vehicle speed when the vehicle speed is within a low vehicle speed range.

FIG. 2A is a block diagram showing the main components of the vehicle control device 11 according to the embodiment of the present invention. FIG. 2B is a characteristic chart which the vehicle control device 11 according to the embodiment refers to when setting a deadband for a steering angle SA, and in which steering angles before and after deadband processing for the steering angle SA are shown in comparison. FIG. 2C is a characteristic chart of a first vehicle speed ratio Rvs1 that the vehicle control device 11 according to the embodiment refers to when changing the deadband for the steering angle SA according to a change in the vehicle speed VS when the vehicle speed VS is within a low vehicle speed range. FIG. 2D is a characteristic chart of a second vehicle speed ratio Rvs2 that the vehicle control device 11 according to the embodiment refers to when changing the brake force for a specific wheel according to a change in the vehicle speed VS when the vehicle speed VS is within a low vehicle speed range.

As shown in FIG. 2A, the vehicle control device 11 according to the embodiment of the present invention includes a steering direction determiner 71, a steering angle deadband setter 73, a steering angle command value calculator 74, a first vehicle speed ratio setter 75, a second vehicle speed ratio setter 77, a first multiplier 80, a target wheel determiner 81, and a brake force setter 83.

The steering direction determiner 71 determines a steering direction based on the steering direction information (sign type) in the time-series information on the steering angle SA.

As shown in FIG. 2B, the steering angle deadband setter 73 sets a deadband width for the steering angle SA based on the time-series information on the steering angle SA. The deadband width for the steering angle SA means an operation region where steering is recognized as invalid based on the neutral position (steering center point) of the steering wheel. In the example shown in FIG. 2B, an x axis represents a steering angle SA0 before the deadband processing and a y axis represents a steering angle SA1 after the deadband processing. As shown in FIG. 2B, a deadband width 2SAth for the steering angle SA is defined by a left steering critical value (−SAth) and a right steering critical value (+SAth) positioned on both sides of the steering center point. The absolute value |SAth| of each of the left steering critical value (−SAth) and the right steering critical value (+SAth) is equivalent to a first steering angle threshold.

In the example shown in FIG. 2B, the time-series information on the steering angle SA is expressed by a combination of the sign indicating the steering direction and the numerical value indicating the steering degree.

In more detail, the steering angle deadband setter 73 sets the first steering angle threshold (|SAth|) based on the time-series information on the steering angle SA and the information on the vehicle speed VS (the first vehicle speed ratio Rvs1). specifically, when the vehicle speed VS is within a low vehicle speed range (for example, a slow vehicle speed range of about 10 km/h or lower), the steering angle deadband setter 73 variably sets the first steering angle threshold (|SAth|) to a smaller value as the vehicle speed VS becomes lower. In other words, the deadband width 2SAth for the steering angle SA is set to be narrower as the vehicle speed VS becomes lower.

Thus, when the vehicle speed VS is within the low vehicle speed range, even a slight change in the steering angle SA is reflected in a result of calculation of a brake force for the tight-turn facilitation control.

The steering angle command value calculator 74 calculates a steering angle command value based on the deadband width 2SAth for the steering angle SA set by the steering angle deadband setter 73.

The first vehicle speed ratio setter 75 has a function to set a value of the first vehicle speed ratio Rvs1 to be referred to for changing the deadband width 2SAth for the steering angle SA according to a change in the vehicle speed VS.

To implement the above function, when the vehicle speed VS is within the low vehicle speed range (VS<VSth12), in particular, the first vehicle speed ratio setter 75 appropriately sets a value less than 1 as the first vehicle speed ratio Rvs1 suitable for the vehicle speed VS according to the characteristic chart shown in FIG. 2C.

In more detail, in the first vehicle speed ratio Rvs1 having the characteristic shown in FIG. 2C, a fixed value (0) is allocated for the vehicle speed VS within a region up to an 11th vehicle speed value Vsth11 (VS=<VSth11), a linear variable value (0.5-1) is allocated for the vehicle speed VS within a region above the 11th vehicle speed value Vsth11 up to a 12th vehicle speed value Vsth12 (VSth11<VS=<VSth12), and a fixed value (1) is allocated for the vehicle speed VS within a region above the 12th vehicle speed value Vsth12 (VS>VSth12).

The steering angle deadband setter 73 multiplies the value of the first vehicle speed ratio Rvs1 set by the first vehicle speed ratio setter 75 by the numerical value of the steering angle SA indicating the steering degree. In this way, when the vehicle speed VS is within the low vehicle speed range (VS<VSth12), the deadband width 2SAth for the steering angle SA can be changed according to a change in the vehicle speed VS.

The second vehicle speed ratio setter 77 has a function to set a value of the second vehicle speed ratio Rvs2 to be referred to for changing the brake force for the specific wheel according to a change in the vehicle speed VS.

To implement the above function, when the vehicle speed VS is within a low vehicle speed range (VS=<VSth22), the second vehicle speed ratio setter 77 appropriately sets a value less than 1 as the second vehicle speed ratio Rvs2 suitable for the vehicle speed VS according to the characteristic chart shown in FIG. 2D.

In more detail, in the second vehicle speed ratio Rvs2 having the characteristic shown in FIG. 2D, a fixed value (0) is allocated for the vehicle speed VS within a region up to a 21st vehicle speed value VSth21 (VS=<VSth21), and a variable value (0-1) having a gradually increasing linear characteristic is allocated for the vehicle speed VS within a region above the 21st vehicle speed value VSth21 up to a 22nd vehicle speed value VSth22 (VSth21<VS=<VSth22).

Instead of the variable value (0-1) having the gradually increasing linear characteristic, for example, a variable value (0-1) having a gradually increasing non-linear characteristic with gentle rise from 0 may be employed.

Then, a fixed value (1) is allocated for the vehicle speed VS within a region above the 22nd vehicle speed value VSth22 up to a 23rd vehicle speed value VSth23 (VSth22<VS=<VSth23).

Further, a variable value (1-0) having a gradually decreasing linear characteristic is allocated for the vehicle speed VS within a region above the 23rd vehicle speed value VSth23 up to a 24th vehicle speed value VSth24 (VSth23<VS=<VSth24), and a fixed value (0) is allocated for the vehicle speed VS within a region above the 24th vehicle speed value VSth24 (VS>VSth24).

The first multiplier 80 multiplies the value of the second vehicle speed ratio Rvs2 set by the second vehicle speed ratio setter 77 by the steering angle command value calculated by the steering angle command value calculator 74.

In this way, in a case where the vehicle speed VS takes a value exceeding the deadband region (0=<VS=<VSth21) in the low vehicle speed range (in sum, a case where the specific wheel that was stopped starts to move), it is possible to, according to a change in the vehicle speed VS, gradually increase the brake force for the specific wheel as the vehicle speed VS becomes higher (gradually decrease the brake force for the specific wheel as the vehicle speed VS becomes lower), instead of instantaneously raising the brake force for the specific wheel (sharply increasing the value of the second vehicle speed ratio Rvs2 from 0 to 1).

As a result, even during execution of the tight-turn facilitation control of the specific wheel in order to facilitate a tight-turn of the vehicle 10, it is possible to minimize creeping noise as much as possible to create a comfortable driving environment, thereby contributing to a development of a sustainable transport system.

Here, the 11th vehicle speed value VSth11 (see FIG. 2C) for the first vehicle speed ratio setter 75 and the 21st vehicle speed value VSth21 (see FIG. 2D) for the second vehicle speed ratio setter 77 may be a common value or values different from each other.

Similarly, the 12th vehicle speed value VSth12 (see FIG. 2C) for the first vehicle speed ratio setter 75 and the 22nd vehicle speed value VSth22 (see FIG. 2D) for the second vehicle speed ratio setter 77 may be a common value or values different from each other.

The first multiplier 80 multiplies the steering angle command value calculated by the steering angle command value calculator 74 by the value of the second vehicle speed ratio Rvs2 set by the second vehicle speed ratio setter 77. Thus, the first multiplier 80 calculates the integrated brake force IBF that is a brake force for the tight-turn facilitation control with both of the steering angle SA and the vehicle speed VS taken into consideration. The integrated brake force IBF, that is, a multiplication result of the first multiplier 80 is transmitted to both of the target wheel determiner 81 and the brake force setter 83.

As in the target wheel determiner 53, the target wheel determiner 81 determines a target wheel to be involved in the tight-turn facilitation control aiming to facilitate a tight-turn of the vehicle 10 based on the information on the vehicle speed VS, the information on the wheel speeds WS, the time-series information on the steering angle SA, and so on acquired by the information acquirer 51. In this specification, the target wheel thus determined may be herein referred to as a specific wheel in some cases.

The brake force setter 83 sets the integrated brake force IBF for the tight-turn facilitation control among the multiple wheels including the specific wheel as appropriate based on the information on the vehicle speed VS, the information on the wheel speeds WS, the time-series information on the steering angle SA, the information on the required brake force, and so on acquired by the information acquirer 51, and outputs each of the brake forces thus set as a brake force command value.

Moreover, when the steering wheel is in a one side steering position, in a case of a first brake force BF1s is set to a first specific wheel selected based on at least the steering position, the brake force setter 83, based on the time-series information on the steering angle SA and the information on the steering angle speed SS, remains the first brake force BF1s on the first specific wheel during a turn-over operation while the turn-over operation is performed from the one side steering position through a neutral position to other side steering position. Here, a meaning of remaining the first brake force BF1s on the first specific wheel is to keep the first brake force BF1s having a brake force of value exceeding zero for the first specific wheel.

It should be noted that the first brake force when the turn-over operation is performed may be reduced from the first brake force when the turn-over operation is not performed, and the first brake force when the turn-over operation is performed should be set to the value exceeding zero.

Basic Operations of Vehicle Control Device 11 According to Embodiment of Invention Next, basic operations of the vehicle control device 11 according to the embodiment will be described with reference to FIG. 3.

Figure 3:
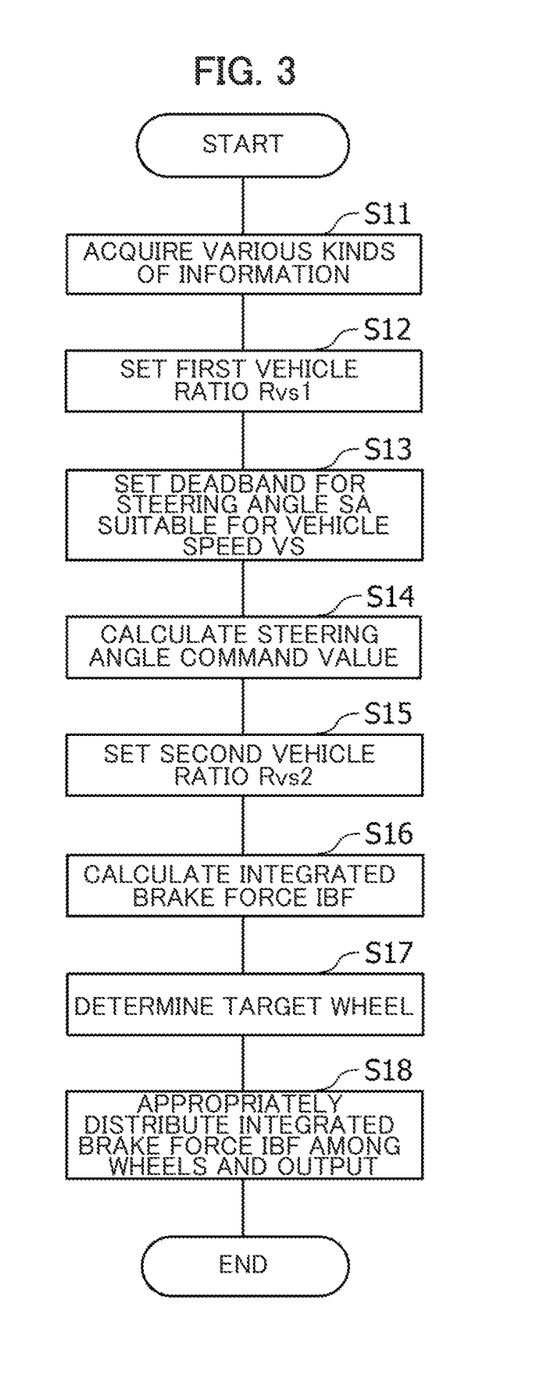
FIG. 3 is a flowchart showing basic operations of the vehicle control device according to the embodiment of the present invention.

FIG. 3 is a flowchart showing basic operations of the vehicle control device 11 according to the embodiment of the present invention.

In step S11 shown in FIG. 3, the information acquirer 51 in the integrated ECU 13 acquires each of various kinds of information containing the information on the vehicle speed VS, the information on the wheel speeds WS, the time-series information on the steering angle SA, the time-series information on the steering angle speed SS, the BP operation information, the AP position information, the shift range operation information, the information on an obstacle distribution OD, the information on images on the right and left sides of the vehicle 10.

In step S12, the first vehicle speed ratio setter 75 sets the value of the first vehicle speed ratio Rvs1 to be referred to for changing the deadband width 2SAth for the steering angle SA according to a change in the vehicle speed VS.

In step S13, the steering angle deadband setter 73 sets the first steering angle threshold (|SAth|) based on the time-series information on the steering angle SA and the information on the vehicle speed VS (the first vehicle speed ratio Rvs1). As a result, the deadband width 2SAth for the steering angle SA is set.

In step S14, the steering angle command value calculator 74 calculates the steering angle command value based on the deadband width 2SAth for the steering angle SA set by the steering angle deadband setter 73.

In step S15, the second vehicle speed ratio setter 77 sets the value of the second vehicle speed ratio Rvs2 to be referred to for changing the brake force for the specific wheel according to a change in the vehicle speed VS. When the vehicle speed VS is within the low vehicle speed range, the second vehicle speed ratio Rvs2 to be variably set depending on the vehicle speed VS is set to a value less than 1.

In step S16, the first multiplier 80 multiplies the steering angle command value calculated by the steering angle command value calculator 74 by the value of the second vehicle speed ratio Rvs2 set by the second vehicle speed ratio setter 77, thereby calculating the integrated brake force IBF for the tight-turn facilitation control with both of the steering angle SA and the vehicle speed VS taken into consideration.

In step S17, the target wheel determiner 81 determines a target wheel to be involved in the tight-turn facilitation control aiming to facilitate a tight-turn of the vehicle 10 based on the information on the vehicle speed VS, the information on the wheel speeds WS, the time-series information on the steering angle SA, and so on acquired by the information acquirer 51 as in the target wheel determiner 53.

In step S18, the brake force setter 83 sets the integrated brake force IBF for the tight-turn facilitation control among the multiple wheels including the specific wheel as appropriate based on the information on the vehicle speed VS, the information on the wheel speeds WS, the time-series information on the steering angle SA, the information on the required brake force, and so on acquired by the information acquirer 51, and outputs each of the brake forces thus set as a brake force command value.

Applied Operation of Vehicle Control Device 11 According to Embodiment of Present Invention Next, an applied operation of the vehicle control device 11 according to the embodiment of the present invention is described with reference to FIG. 4.

Figure 4:
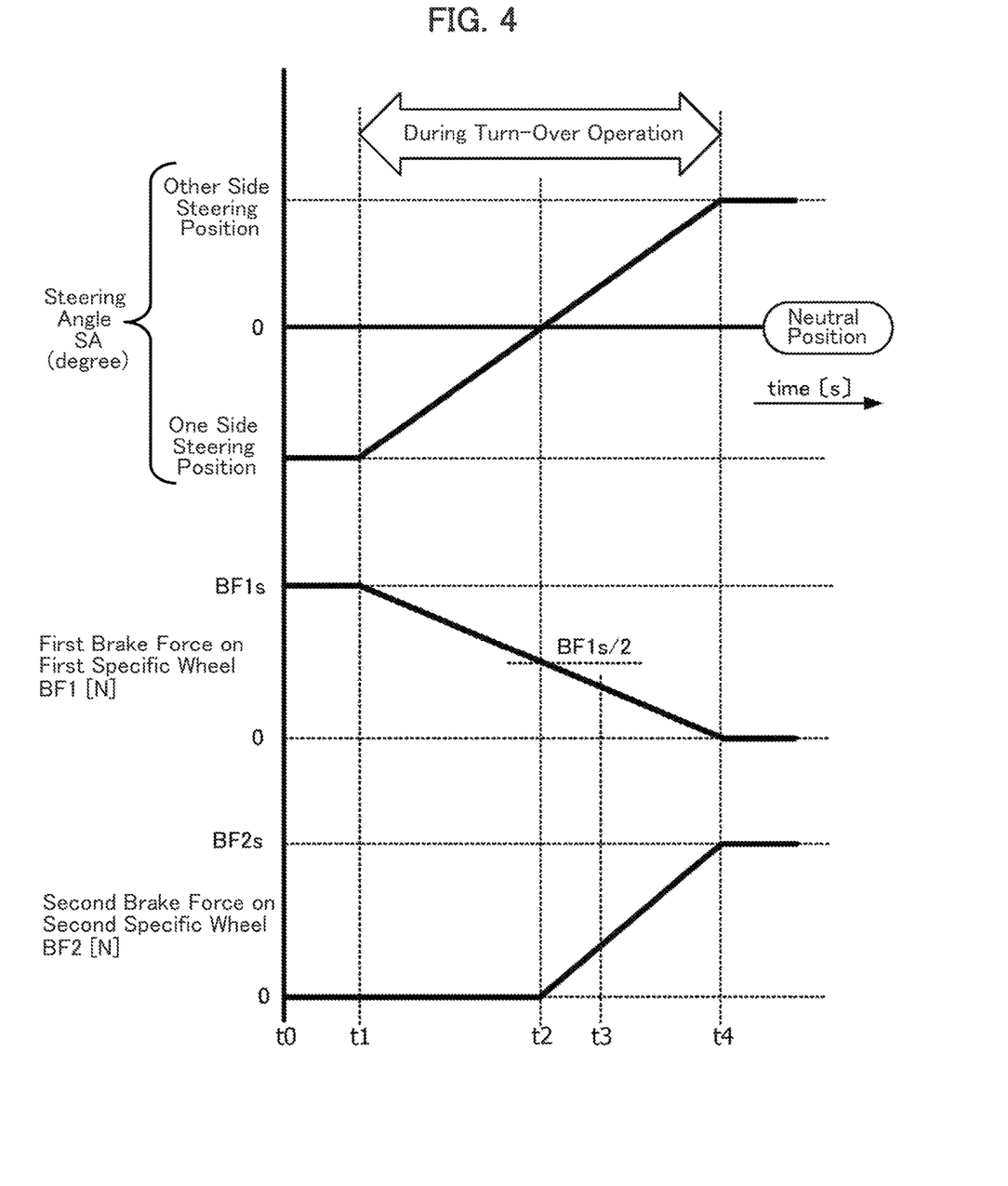
FIG. 4 is a time chart diagram showing applied operation of the vehicle control device according to the embodiment of the present invention.

FIG. 4 is a time chart diagram showing the applied operation of the vehicle control device 11 according to the embodiment of the present invention.

Assume that the vehicle 10 is turning forward at a slow vehicle speed (e.g., 5-10 km/h) and that the tight-turn facilitation control is in progress.

Just before time t0-t1 shown in FIG. 4, the steering angle SA is turned to the one side steering position (e.g., the left end steering position). Just before the same time t0-t1, a predetermined value BF1s (set appropriately based on the vehicle speed VS, steering angle SA, etc.) is applied as the first brake force BF1 for the first specific wheel selected by the target wheel determiner 53.

At time t1, a turn-back operation (the turn-over operation) of the steering wheel is started. Here, the turn-back operation of the steering wheel is an operation to return the steering wheel from the one-side steering position (or the other side steering position) toward the neutral position. On the other hand, the turn-over operation of the steering wheel is an operation to turn-over the steering wheel from the one-side steering position (or the other side steering position) through the neutral position toward the other side steering position (or the one-side steering position) on the opposite side.

At time t1-t4, the turn-over operation of the steering wheel is continuously performed. In other words, the section of time t1-t4 corresponds to the time of the turn-over operation in progress.

At time t1-t2 during time t1-t4, the turn-back operation is performed during the steering angle SA returns from the one side steering position to the neutral position. At the same time t1-t2, the first brake force BF1 for the first specific wheel is gradually decreasing linearly from the predetermined value BF1s to half the value BF1s/2 according to the change mode (changing with the predetermined steering angle speed SS) of the steering angle SA.

At time t2-t3 during time t1-t4, the turn-over operation is performed so that the steering angle SA turns from the neutral position to the other side steering position. At the same time t2-t3, the first brake force BF1 for the first specific wheel is continuously, linearly and gradually decreasing according to the change mode of the steering angle SA.

It should be noted that, at the same time t2, the second brake force BF2 for the second specific wheel selected by the target wheel determiner 53 begins to rise. At the same time t2-t3, the second brake force BF2 for the second specific wheel, contrary to the first brake force BF1 for the first specific wheel, is linearly and gradually increasing according to the change mode (changing with the prescribed steering angle speed SS) of the steering angle SA.

At time t3 during time t1-t4, the first brake force BF1 for the first specific wheel and the second brake force BF2 for the second specific wheel have a same value.

In other words, the brake force setter 55, during the turn-over operation (see section of time t1-t4), sets the brake forces so that the first brake force and the second brake force cross from each other at the point (time t3) after the predetermined waiting time elapses starting from the point (time t2) when the steering wheel reaches the neutral position.

Note that the predetermined waiting time does not necessarily have to be the length of time required for the second brake force BF2 for the second specific wheel to be changed from the predetermined value BF1s to half that value BF1s/2, but it can be set to a length of time in which the second brake force BF2 has a value exceeding zero.

At time t3-t4 during time t1-t4, the turn-over operation of the steering angle SA is performed from the neutral position to the other side steering position. At the same time t3-t4, the first brake force BF1 for the first specific wheel is linearly and gradually decreasing according to the change mode of the steering angle SA. At the same time t3-t4, the second brake force BF2 for the second specific wheel is, contrary to the first brake force BF1 for the first specific wheel, linearly and gradually increasing according to the change mode of the steering angle SA.

At time t4, the turn-over operation of the steering wheel is completed. After the same time t4, the steering angle SA is held in the other side steering position (e.g., the right end steering position). After the same time t4, the value of the first brake force BF1 for the first specific wheel has converged to zero. After the same time t4, the second brake force BF2 for the second specific wheel, contrary to the first brake force BF1 for the first specific wheel, is held in the predetermined value BF2s (set appropriately based on the vehicle speed VS, steering angle SA, etc.).

Effect of the Vehicle Control Device 11 on the Embodiment of Present Invention In the vehicle control device 11 according to the first aspect of the embodiment of the present invention, when the steering wheel is in the one side steering position, in the case of the first brake force is set to the first specific wheel selected based on at least the steering position, the brake force setter remains the first brake force for the first specific wheel during the turn-over operation (see the section of time t1-t4 shown in FIG. 4) while the turn-over operation is performed from the one side steering position through the neutral position to the other side steering position. Here, the meaning of remaining the first brake force BF1 for the first specific wheel is to keep the first brake force BF1 having the value exceeding zero for the first specific wheel.

According to the vehicle control device 11 based on the first aspect, even if the turn-over operation of the steering is performed, the abrupt vehicle movement can be suppressed (ensuring vehicle behavior stability) to create the comfortable driving environment, thereby contributing to the development of the sustainable transportation system.

In the vehicle control device 11 according to the second aspect of the embodiment of the present invention, the brake force setter 55, during the turn-over operation (see the section of time t1-t4 shown in FIG. 4), remains the first brake force for the first specific wheel until the predetermined waiting time (see time length (t3-t2) shown in FIG. 4) elapses starting from the point (t2) when the steering wheel reaches the neutral position while the steering wheel is in position from the one side steering position through the neutral position to the other side steering position. Here, the meaning of remaining the first brake force BF1 for the first specific wheel is to keep the first brake force BF1 having the value exceeding zero on the first specific wheel.

However, the predetermined waiting time can be set to an appropriate length of time, taking into consideration that the steering wheel is in the other side steering position beyond the neutral position from the one side steering position (in a sufficiently turned-over state) after the waiting time has elapsed.

According to the vehicle control device 11 according to the second aspect of the embodiment of the present invention, in comparison with the vehicle control device 11 according to the first aspect, regardless of the temporal speed (steering angle speed SS) at which the steering wheel turns from the one side steering position through the neutral position to the other side steering position, the vehicle control device can remain the first brake force BF1 for the first specific wheel until the predetermined waiting time elapses starting from the time when the steering wheel is reached to the neutral position.

As a result, even if the turn-over operation of the steering is performed, the effect of creating the comfortable driving environment by suppressing the abrupt vehicle movement can be achieved more properly.

In the vehicle control device 11 based on the third aspect of the embodiment of the present invention, the brake force setter 55, during the continuous turn-over operation is performed in the turn-over operation, namely during the steering angle SA is continuously changed toward the direction according to the turn-over operation, gradually decreases the first brake force for the first specific wheel according to the change mode of the steering angle. Here, the change mode of the steering angle SA is mainly assumed to be the change mode of the steering angle speed SS over time.

That is, in the embodiment of the present invention, as the change mode of the steering angle SA, FIG. 4 shows the example of the linear characteristic mode in which the temporal change of the steering angle speed SS is constant, but actually a nonlinear characteristic mode in which the temporal change of the steering angle speed SS is not constant will be assumed. In such a case, the gradual decreasing characteristic of the first brake force BF1 for the first specific wheel will also shows the nonlinear characteristics according to the nonlinear characteristic of the steering angle speed SS.

According to the vehicle control device 11 based on the third aspect, during the continuous turn-over operation is performed in the turn-over operation (during the steering angle SA continues to change in the direction according to the turn-over operation), the first brake force BF1 for the first specific wheel is gradually decreased according to the change mode of the steering angle SA. Therefore, similar to the vehicle control device 11 based on the second aspect, even if the turn-over operation of the steering is performed, the effect of creating the comfortable driving environment by suppressing the abrupt vehicle movement can be achieved more properly.

In the vehicle control device 11 according to the fourth aspect of the embodiment of the present invention, in the case of the turn-over operation is performed, when the steering wheel is in the other side steering position, the brake force setter sets the second brake force BF2 for the second specific wheel selected based on at least the steering position, and the brake force setter gradually decreases the first brake force BF1 for the first specific wheel according to the change mode of the steering angle SA and gradually increases the second brake force BF2 for the second specific wheel according to the change mode of the steering angle SA during the turn-over operation.

According to the vehicle control device 11 based on the fourth aspect, the brake force setter gradually decreases the first brake force BF1 for the first specific wheel according to the change mode of the steering angle SA and gradually increases the second brake force BF2 for the second specific wheel according to the change mode of the steering angle SA during the turn-over operation. Therefore, in comparison with the vehicle control device 11 based on the first or second aspect, a switching of the brake force for the specific wheel in association with the turn-over operation can be smoothly achieved, thereby improving the ride comfort of the vehicle.

In the vehicle control device 11 according to the fifth aspect of the embodiment of the present invention, the brake force setter 55, during the turn-over operation, sets the brake forces so that the first brake force for the first specific wheel and the second brake force for the second specific wheel cross (having same value) after the predetermined waiting time elapses starting from the point when the steering wheel reaches the neutral position.

According to the vehicle control device 11 according to the fifth aspect of the embodiment of the present invention, the brake force setter 55, during the turn-over operation, sets the brake forces so that the first brake force for the first specific wheel and the second brake force for the second specific wheel cross (having same value) after the predetermined waiting time elapses starting from the point when the steering wheel reaches the neutral position. Therefore, similar to the vehicle control device 11 of the fourth aspect, the switching of the brake force for the specific wheel during the turn-over operation can be smoothly achieved, thereby improving the ride comfort of the vehicle.

Other Embodiments

The several embodiments described above merely represent embodied examples of the present invention. Therefore, the technical scope of the present invention should not be interpreted by being limited to these embodiments. The present invention may be carried out in various modes without departing from the gist or main features of the present invention.

For example, the embodiments of the present invention are described by using the example in which the vehicle control device 11 according to the embodiment of the present invention is applied to the vehicle equipped with the internal combustion engine as a power source, but the present invention is not limited to this example. The present invention may be applied to an electric vehicle equipped with a motor generator as a power source, a hybrid vehicle equipped with an internal combustion engine and a motor generator as power sources, and the like.

What is claimed is:

1. A vehicle control device comprising:
an information acquirer that acquires information on driving conditions of a vehicle at least containing a steering angle of a steering wheel and a vehicle speed;
a brake force setter that sets a brake force to each of a plurality of wheels provided in the vehicle based on the driving conditions of the vehicle; and
a brake controller that performs brake control for each of the plurality of wheels using the brake force set by the brake force setter,
wherein
when the steering wheel is in one side steering position, in a case of a first brake force is set to a first specific wheel selected based on at least the steering position, the brake force setter remains the first brake force for the first specific wheel during a turn-over operation while the turn-over operation is performed from the one side steering position through a neutral position to other side steering position, and
the brake force setter, in the case of the turn-over operation is performed, sets a second brake force for a second specific wheel selected based on at least a steering position when the steering wheel is in the other side steering position, and the brake force setter gradually decreases the first brake force for the first specific wheel according to a change mode of the steering angle and gradually increases the second brake force for the second specific wheel according to the change mode of the steering angle during the turn-over operation.

2. The vehicle control device according to claim 1, wherein
the brake force setter, during the turn-over operation, sets the brake forces so that the first brake force for the first specific wheel and the second brake force for the second specific wheel have same value after the predetermined waiting time elapses starting from the point when the steering wheel reaches the neutral position.

3. The vehicle control device according to claim 1, wherein
the brake force setter, during the turn-over operation, remains the first brake force for the first specific wheel until a predetermined waiting time elapses starting from the point when the steering wheel reaches the neutral position while the steering wheel is in position from the one side steering position through the neutral position to the other side steering position.

* * * * *